(12) United States Patent
Block et al.

(10) Patent No.: US 8,564,337 B2
(45) Date of Patent: Oct. 22, 2013

(54) CLOCK TREE INSERTION DELAY INDEPENDENT INTERFACE

(75) Inventors: Stefan Block, Munich (DE); Herbert Preuthen, Dorfen (DE); Juergen Dirks, Holzkirchen (DE)

(73) Assignee: LSI Corporation, Milpitas, CA (US)

( * ) Notice: Subject to any disclaimer, the term of this patent is extended or adjusted under 35 U.S.C. 154(b) by 224 days.

(21) Appl. No.: 13/022,824

(22) Filed: Feb. 8, 2011

(65) Prior Publication Data

US 2012/0200322 A1 Aug. 9, 2012

(51) Int. Cl.
*H03L 7/00* (2006.01)

(52) U.S. Cl.
USPC .......................................... 327/141; 327/142

(58) Field of Classification Search
USPC ......... 327/379, 387–389, 392–402, 427, 434, 327/436, 437, 141–150, 152
See application file for complete search history.

(56) References Cited

U.S. PATENT DOCUMENTS

2007/0129923 A1* 6/2007 Langer et al. ................... 703/13

* cited by examiner

*Primary Examiner* — Lincoln Donovan
*Assistant Examiner* — Diana J Cheng

(57) ABSTRACT

Disclosed herein is a multi-clock interface, an integrated circuit and a module thereof having the multi-clock interface and a library having cells corresponding to the above noted circuitry. In one embodiment the multi-clock interface includes: (1) a multi-clock reset synchronizer configured to receive a first external clock signal and a second external clock signal that is a multiple of the first clock signal, the reset synchronizer configured to synchronize a reset of both the first and second external clock signals and based thereon generate a reset release signal and (2) a multi-phase clock generator configured to receive the reset release signal and the second clock signal, the multi-phase clock generator configured to generate multiple clock phases from the second clock signal based on the reset release signal.

20 Claims, 5 Drawing Sheets

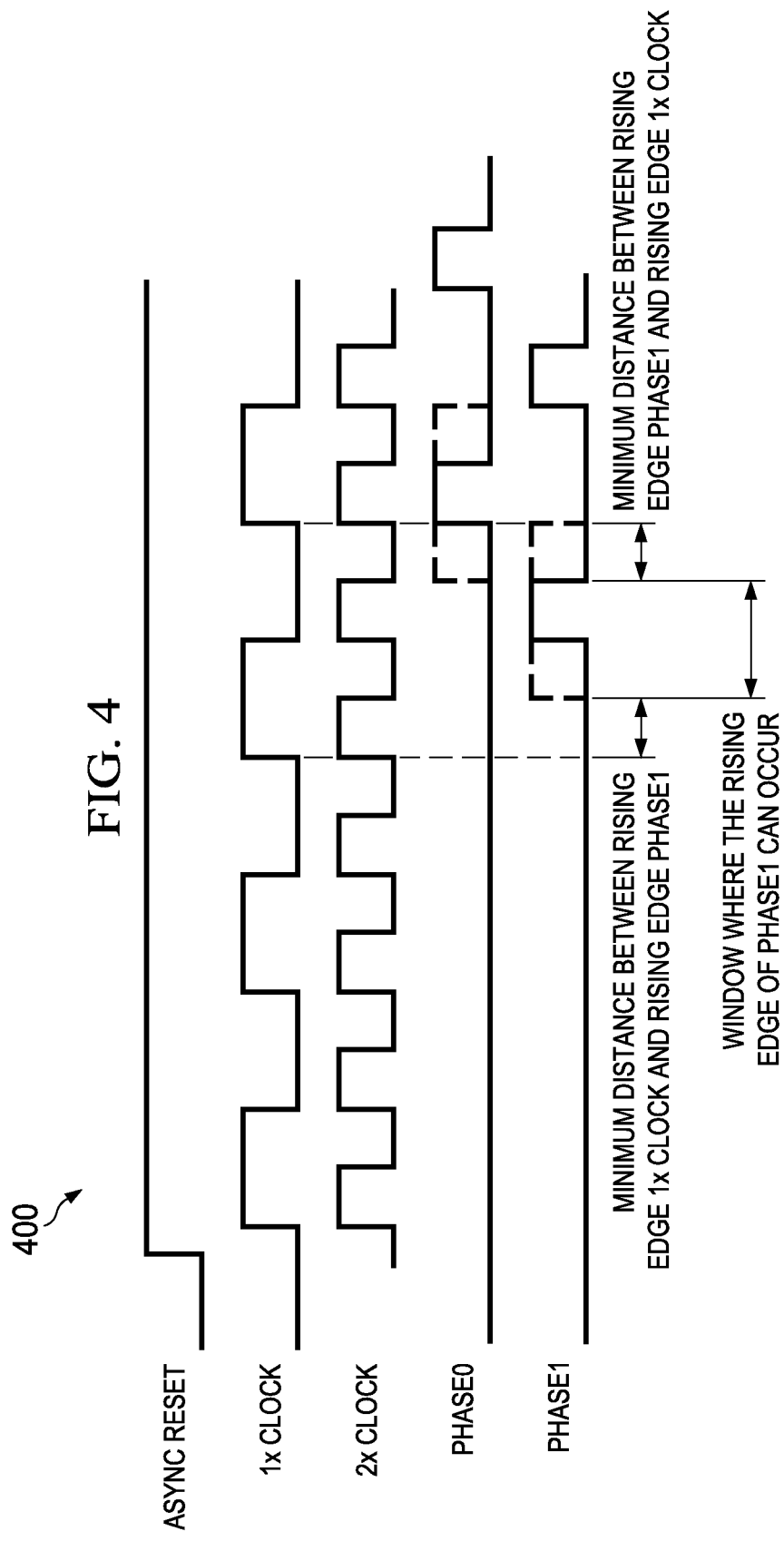

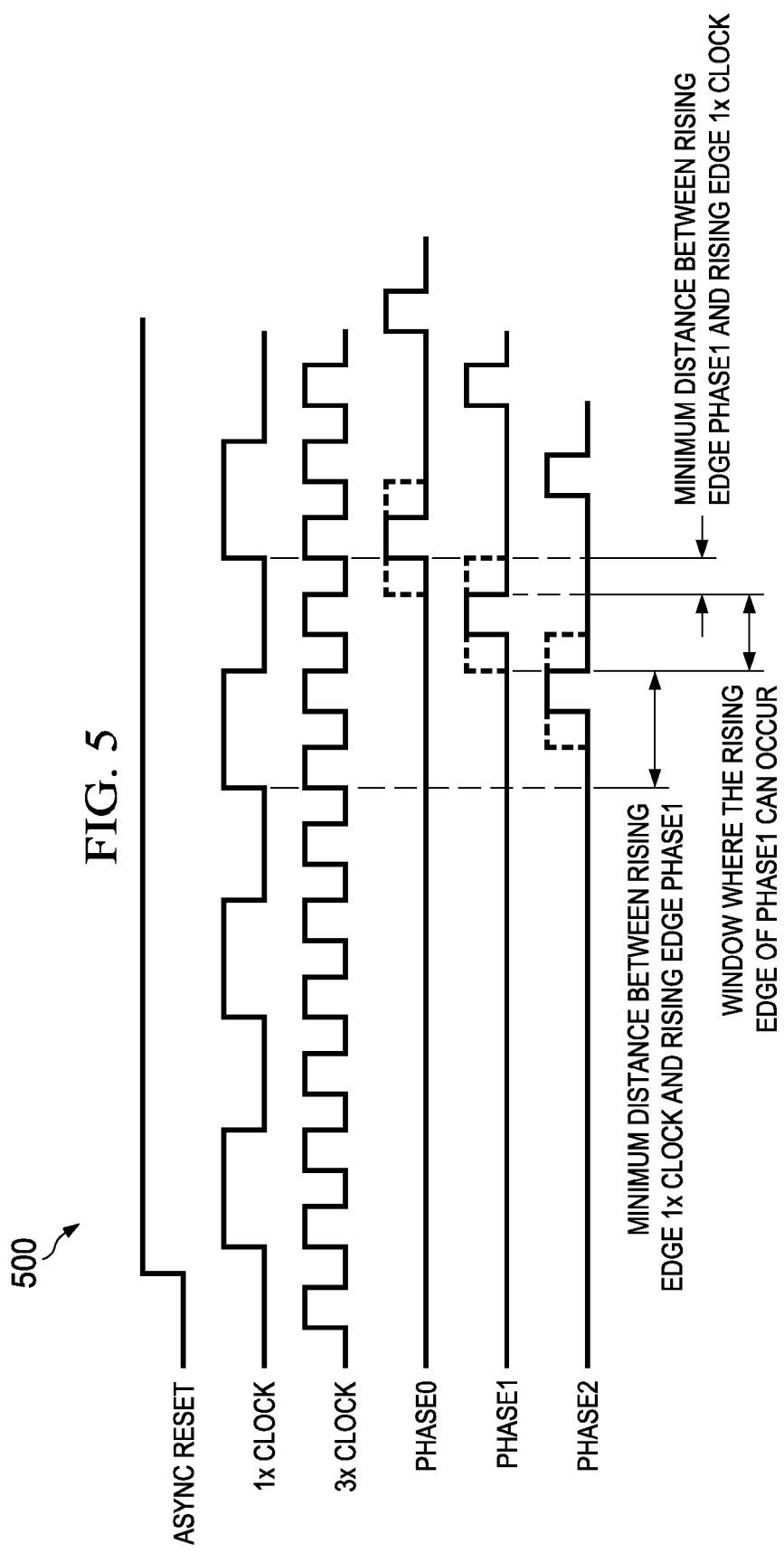

CLOCK TREE INSERTION DELAY INDEPENDENT INTERFACE

TECHNICAL FIELD

This application is directed, in general, to integrated circuits (ICs) and, more specifically, to synchronizing clock-trees of integrated circuits.

BACKGROUND

Circuit designers use electronic design automation (EDA) tools, a category of computer aided design (CAD) tools, to create a functional circuit design, including a register transfer logic (RTL) representation of the functional circuit design, synthesize a "netlist" from the RTL representation, and implement a layout from the netlists. Synthesis of the netlist and implementation of the layout involve simulating the operation of the circuit and determining where cells should be placed and where the interconnects that couple the cells together should be routed. Timing signoff is one of the last steps in the IC design process and ensures that signal propagation speed in a newly-designed circuit is such that the circuit will operate as intended. Even with EDA tools designed to coordinate the timing in integrated circuits, current design methodologies are limited at the point of clock-tree-synthesis (CTS).

Typical design methodologies for integrated circuits with multiple clock domains require the design team provide estimates of clock insertion delays based on designer knowledge. Given the complexity of inter-clock transfers in modern designs and the sheer number of clock domains, it is usually not possible for the design team to understand all the inter-clock transfers that can be impacted by the clock-tree insertion delays. One way to get an interface between clock domains to operate properly is to align the insertion delay of the two clock-trees at the top level of design flow for the integrated circuit. Thus, clock signals can be externally aligned before being provided to different modules of the integrated circuit. This, however, can be difficult because the clock-trees usually have different loading. Additionally, on-chip-variation (OCV), crosstalk and other effects make this clock alignment more challenging with new technologies. Accordingly, problems with the design of the integrated circuit can occur.

SUMMARY

One aspect provides a multi-clock interface. In one embodiment the multi-clock interface includes: (1) a multi-clock reset synchronizer configured to receive a first external clock signal and a second external clock signal that is a multiple of the first clock signal, the reset synchronizer configured to synchronize a reset of both the first and second external clock signals and based thereon generate a reset release signal and (2) a multi-phase clock generator configured to receive the reset release signal and the second clock signal, the multi-phase clock generator configured to generate multiple clock phases from the second clock signal based on the reset release signal.

In another aspect, an integrated circuit module is disclosed. In one embodiment, the integrated circuit module includes: (1) an input interface configured to receive input data at a first external clock signal and provide captured input data at a first internal clock signal, (2) functional logic configured to receive the captured input data from the input interface and generate a data output at a second external clock signal that is a multiple of the first external clock signal, (3) an output interface configured to receive the output data at a second external clock signal and provide delivered output data at the first internal clock signal and (4) a multi-clock interface configured to generate the first and the second internal clock signals based on the first and the second external clock signals, the multi-clock interface having: (4A) a multi-clock reset synchronizer configured to receive the first and the second external clock signals, synchronize a reset of both the first and second external clock signals and based thereon, generate a reset release signal and (4B) a multi-phase clock generator configured to receive the reset release signal and the second external clock signal, the multi-phase clock generator configured to generate the first and the second internal clock signals from the second clock signal based on the reset release signal.

In yet another aspect, an integrated circuit is disclosed. In one embodiment, the integrated circuit includes: (1) a clock configured to generate a first external clock signal and a second external clock signal that is a multiple of the first external clock signal, (2) an integrated circuit module, including: (2A) an input interface configured to receive input data at a first external clock signal and provide captured input data at a first internal clock signal, (2B) functional logic configured to receive the captured input data from the input interface and generate a data output at a second external clock signal that is a multiple of the first external clock signal, (2C) an output interface configured to receive the output data at a second external clock signal and provide delivered output data at the first internal clock signal and (2D) a multi-clock interface configured to generate the first and the second internal clock signals based on the first and the second external clock signals, the multi-clock interface having: a multi-clock reset synchronizer configured to receive the first and the second external clock signals, synchronize a reset of both the first and second external clock signals and based thereon, generate a reset release signal and a multi-phase clock generator configured to receive the reset release signal and the second external clock signal, the multi-phase clock generator configured to generate the first and the second internal clock signals from the second clock signal based on the reset release signal.

In still yet another aspect, the disclosure provides a library of cells including logic circuitry corresponding to a multi-clock interface having: (1) a multi-clock reset synchronizer configured to receive a first external clock signal and a second external clock signal that is a multiple of the first clock signal, the reset synchronizer configured to synchronize a reset of both the first and second external clock signals and based thereon generate a reset release signal and (2) a multi-phase clock generator configured to receive the reset release signal and the second clock signal, the multi-phase clock generator configured to generate multiple clock phases from the second clock signal based on the reset release signal.

BRIEF DESCRIPTION

Reference is now made to the following descriptions taken in conjunction with the accompanying drawings, in which:

FIG. 4 illustrates a graph of input and output waveforms of a multi-clock interface constructed according to the principles of the disclosure for the example of N=2;

FIG. 5 illustrates a graph of input and output waveforms of a multi-clock interface constructed according to the principles of the disclosure for the example of N=3.

DETAILED DESCRIPTION

The disclosure provides a clock-tree interface that is independent from the external insertion delay of the clock-trees. As such, when two clocks signals are applied to a module of an integrated circuit, clock-tree delay matching between the two clock signals is not necessary at the top level of the integrated circuit design. Instead, a data interface between two frequency synchronous clock-domains is provided within the module itself that allows using a high speed clock in the module and using a low speed clock at the top level. Accordingly, the disclosed data interface can be used to build modules for integrated circuits, such as hard-macros, and the difficulty of top level layout for the integrated circuit can be eased.

The data interface can transfer data between a first clock, a first clock signal 1x, and a second clock, a second clock signal Nx, that is a multiple of the 1x clock (N=2, 3, 4 . . . ). The first and second clock signals, 1x and Nx, are externally generated with respect to the IC module that includes the data interface. As such, these externally generated first and second clock signals may be referred to herein as first and second external clock signals.

A module of an integrated circuit may use the 1x clock to receive and deliver data and use the Nx clock internally to operate on the data. Interface flip-flops of the module for receiving and delivering the data may operate with the 1x clock, which eases timing closure on the top level of the integrated circuit, and the functional logic of the module can operate with the higher frequency clock Nx.

The disclosed data interface synchronizes a reset on both of the external clock signals. Based on a reset release, a multi-phase clock out of the Nx clock is built. From the multi-phase clock, a phase of the Nx clock is used to save data from the 1x clock and a phase of the Nx clock is used to deliver data to the 1x clock. With the data interface, a phase relation requirement between the external generated 1x and Nx clocks is not necessary.

Figure 1:
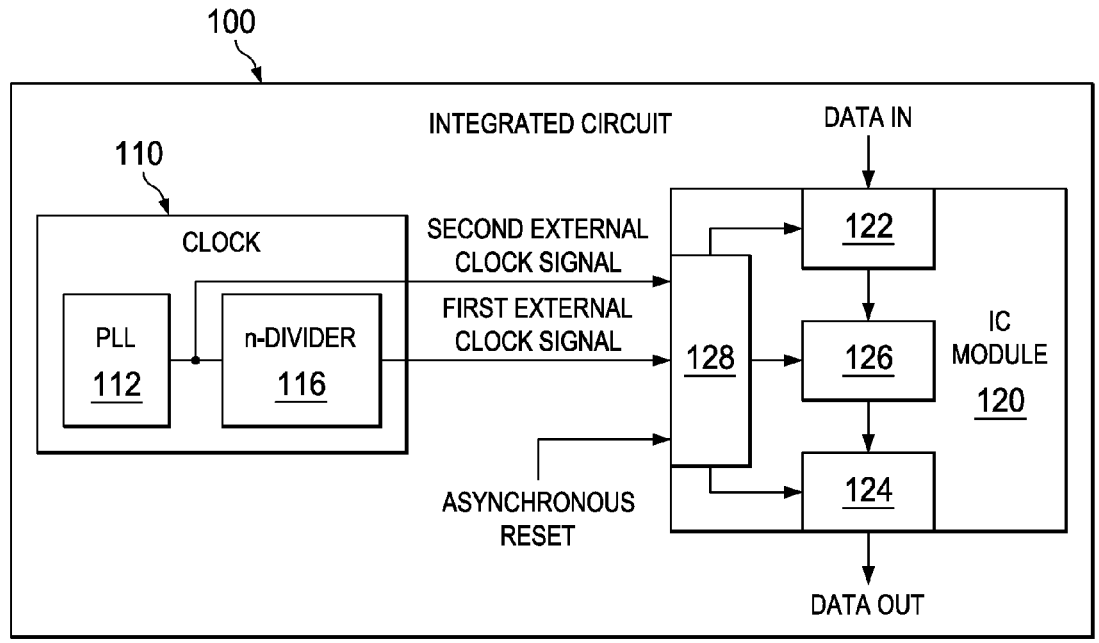
FIG. 1 illustrates a block diagram of an embodiment of an integrated circuit constructed according to the principles of the disclosure.

FIG. 1 illustrates a block diagram of an embodiment of an integrated circuit 100 constructed according to the principles of the disclosure. The integrated circuit 100 includes a clock 110 and an integrated circuit module 120 (module 120). The integrated circuit 100 may also include additional components that are not illustrated or discussed but are typically included in an IC. For example, the integrated circuit 100 may include a scan chain, a TAP controller, a voltage interface, etc. Additionally, one skilled in the art will understand that the integrated circuit 100 may include additional clocks and modules (or sub-modules).

The clock 110 is configured to generate multiple clock signals for the integrated circuit 100. The clock 110 includes a phase-locked loop (PLL) 112 and an n-divider 116 to generate the clock signals. The PLL 112 and the n-divider 116 may be conventional devices typically employed to generate clock signals. The n-divider 116, for example, may be a conventional frequency divider. The PLL 112 generates an original clock signal that is then divided by the n-divider 116 to provide a first external clock signal to the module 120. The original clock signal is provided to the module 120 as a second external clock signal. The first external clock signal has a lower frequency than the undivided second external clock signal and the second external clock signal is a multiple of the first clock signal. The first and second external clock signals are frequency synchronous clock signals. One skilled in the art will understand the operation and configuration of the clock 110.

The module 120 is a functional block of the integrated circuit 100 that is configured to receive input data and generate output data based thereon. The input data may be received from another module (not illustrated) of the integrated circuit 100. The output data generated by the module 120 may be provided to yet another module of the integrated circuit 100. The module 120 includes input interface logic 122 that is configured to receive input data from the integrated circuit 100 and output interface logic 124 that is configured to deliver the output data to the integrated circuit 100. The module 120 also includes functional logic 126 and a multi-clock interface 128. The input interface logic 122, the output interface logic 124 and the multi-clock interface 128 cooperate to provide a data interface that is independent of insertion delays of the first and second external clock signals.

The functional logic 126 is configured to generate the output data from the input data. The functional logic may be logic circuitry that is configured to perform a designated function. The module 120 may be a hard macro. In one embodiment, the module 120 may be a multi-port RAM.

The multi-clock interface 128 is configured to receive both of the externally generated clock signals and, based on the second external clock signal, generate first and second internal clock signals. Both the input interface logic 122 and the output interface logic 124 operate employing the first external clock signal to transfer data in and transfer data out between the module 120 and the integrated circuit 100. The functional logic of the module 120, however, employs the second external clock signal to generate the output data. To insure the accurate transfer of data between the different clock domains of the integrated circuit 100 and the functional logic 126, the input interface logic 122 and the output interface logic 124 use the first and second internal clock signals, respectively. The multi-clock interface 128 is also configured to receive an asynchronous reset that is employed to generate the first and second internal clock signals. The asynchronous reset may be provided by the integrated circuit 100 that is external to the IC module 120. The asynchronous reset may be generated by the integrated circuit 100 or may be received via a chip-pin of the integrated circuit 100 from an external source.

The module 120, therefore includes input interface logic 122 that is configured to receive input data at a first external clock signal and provide captured input data at a first internal clock signal. The functional logic 126 is configured to receive the captured input data from the input interface logic 122 and generate output data employing the second external clock signal that is a multiple of the first external clock signal. The output interface logic 124 is configured to transfer the output data from the functional logic 126 employing a second internal clock signal and provide delivered output data employing the first external clock signal.

The multi-clock interface 128 may include a multi-clock reset synchronizer and a multi-phase clock generator to generate the first and second internal clock signals. In one embodiment, the multi-clock reset synchronizer may be configured to receive the first and second external clock signals, synchronize a reset of both the first and second external clock signals and based thereon, generate a reset release signal. The multi-phase clock generator may be configured to receive the reset release signal and the second external clock signal, and generate the first and the second internal clock signals from the second clock signal based on the reset release signal.

Figure 2:
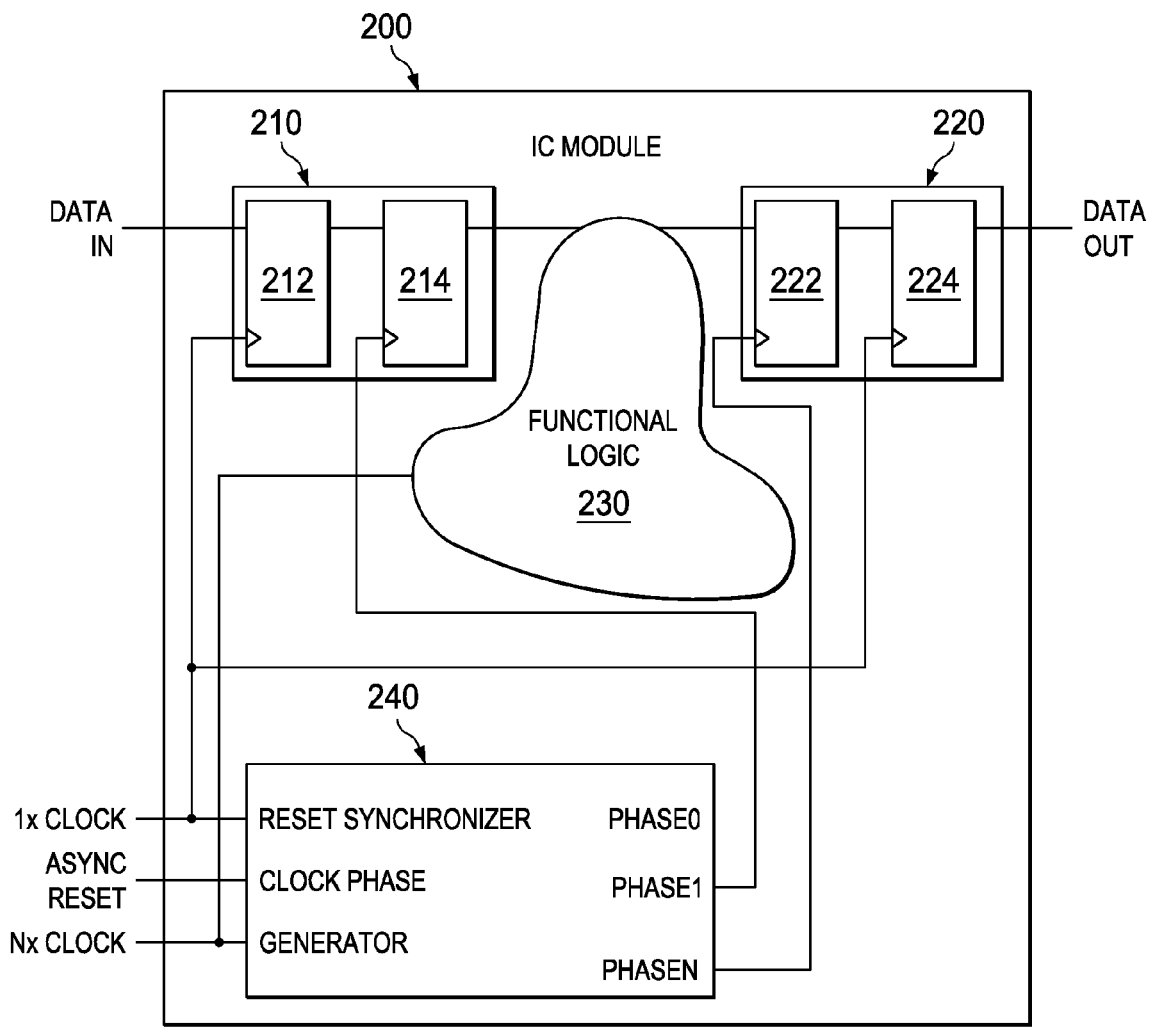
FIG. 2 illustrates a block diagram of an embodiment of an IC module constructed according to the principles of the disclosure.

FIG. 2 illustrates a block diagram of an embodiment of an IC module 200 constructed according to the principles of the disclosure. The IC module 200 includes input interface logic 210, output interface logic 220, functional logic 230 and a multi-clock interface 240. The IC module 200 may be employed in an integrated circuit such as the integrated circuit 100 of FIG. 1. The input interface logic 210, the output interface logic 220 and the multi-clock interface 240 cooperate to form an internal data interface for the IC module 200 that is independent of the insertion delay of the provide external clock signals.

The input interface logic 210 is configured to receive input data employing a first externally generated clock signal and capture the input data employing a first internally generated clock signal. The captured input data is then provided to the functional logic 230. The input interface logic 210 includes an interface flip-flop 212 and a capture flip-flop 214. The interface flip-flop 212 operates employing a first external clock signal and the capture flip-flop 214 operates employing a first internal clock signal. The interface flip-flop 212 and the capture flip-flop 214 may be conventional D flip-flops.

The functional logic 230 receives the captured input data and generates therefrom output data employing the second external clock signal. The second external clock signal is a multiple of the first clock signal and has a higher frequency thereof. The output data is provided to the output interface logic 220.

The output interface logic 220 is configured to receive the output data employing a second internal clock signal and deliver the output data employing the first external clock signal. As such, data comes into and goes out of the IC module 200 employing the same clock signal. The output interface logic 220 includes a receive flip-flop 222 and a deliver flip-flop 224. The receive flip-flop 222 operates at a second internal clock signal to receive the output data from the functional logic 230 and the deliver flip-flop 224 operates at the first external clock signal to capture and deliver the output data from the receive flip-flop 222. The receive flip-flop 222 and the deliver flip-flop 224 may be conventional D flip-flops.

Figure 3:
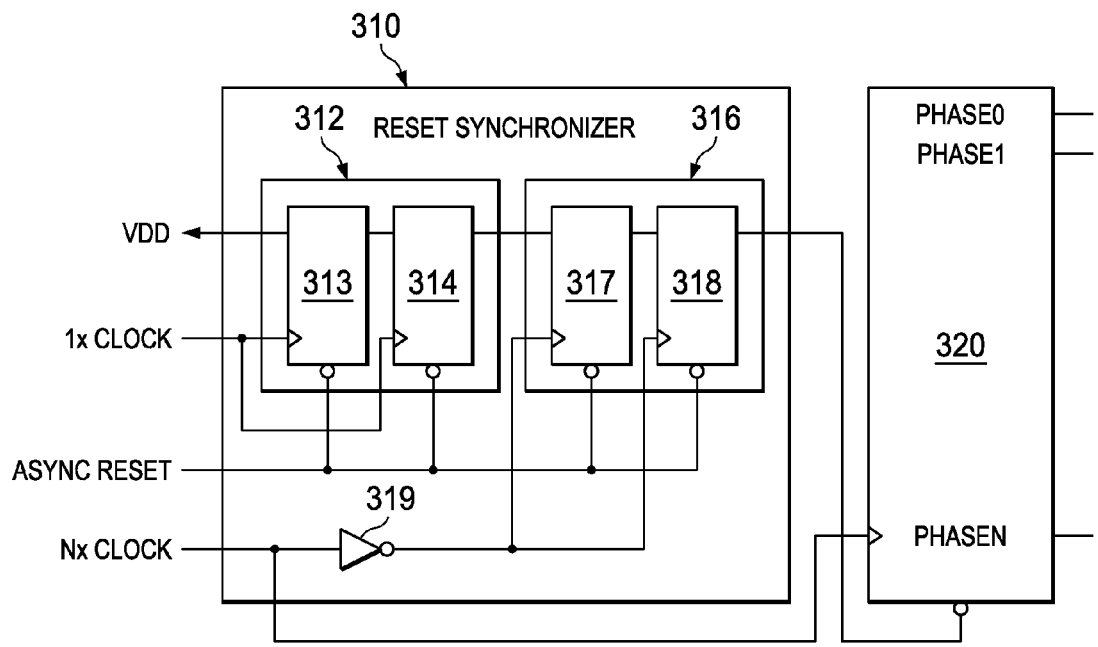
FIG. 3 illustrates a block diagram of an embodiment of a multi-clock interface constructed according to the principles of the disclosure.

The multi-clock interface 240 receives the externally generated clock signals, the first and second external clock signals, for the IC module 200. The multi-clock interface 240 also receives an asynchronous reset. The multi-clock interface 240 employs the asynchronous reset to synchronize a reset on both of the externally generated clock signals. The multi-clock interface 240 employs the resulting reset release signal and the second external clock signal to generate clock phases. The clock phases of the second external clock signal are used for the first and second internal clock signals. Clock signals of the clock phases, the first internal clock signal and the second internal clock signal, are used to save data from and deliver data to the first external clock signal. FIG. 3 provides a more detailed illustration of an embodiment of a multi-clock interface.

FIG. 3 illustrates a block diagram of an embodiment of a multi-clock interface 300 constructed according to the principles of the disclosure. The multi-clock interface 300 is configured to generate first and second internal clock signals based on a second external clock signal. The multi-clock interface 300 includes a multi-clock reset synchronizer 310 and a multi-phase clock generator 320.

The multi-clock reset synchronizer 310 is configured to receive a first external clock signal and a second external clock signal that is a multiple of the first external clock signal, synchronize a reset of both the first and second external clock signals and, based thereon, generate a reset release signal. The reset synchronizer 310 includes first clock synchronizing logic 312 and second clock synchronizing logic 316. The first clock synchronizing logic 312 includes a reset flip-flop 313 and a stabilizing flip-flop 314. Similarly, the second clock synchronizing logic 316 includes a reset flip-flop 317 and a stabilizing flip-flop 318. The first clock synchronizing logic 312 and the second clock synchronizing logic 316 may be configured as a pair of master reset flip-flops that drive the reset release signal.

Each of the flip-flops of the reset synchronizer 310 include a data input, a data output, a clock input and a reset input. The data input of the reset flip-flop 313 is tied high to, for example, VDD of an IC module. The data output of the reset flip-flop 313 is then coupled to the data input of the stabilizing flip-flop 314. The data output of the stabilizing flip-flop 314 is then coupled to the data input of the reset flip-flop 317. The data input of the stabilizing flip-flop 318 is coupled to the data output of the reset flip-flop 317. The data output of the stabilizing flip-flop 318 generates the reset release signal.

The clock inputs of the reset flip-flop 313 and the stabilizing flip-flop 314 both receive the first external clock signal. The clock inputs of the reset flip-flop 317 and the stabilizing flip-flop 318 both receive the second external clock signal that has been delayed by an inverter 319. The reset input of each of the flip-flops receives the asynchronous reset signal. The flip-flops and inverter of the reset synchronizer 310 may be conventional logic components.

The multi-phase clock generator 320 is configured to receive the reset release signal and the second external clock signal. In one embodiment, the multi-phase clock generator 320 may be a counter. Employing the second external clock signal and the reset release signal, the multi-phase clock generator 320 generates multi-phase clock signals. The reset scheme provided by the reset synchronizer 300 ensures that the rising edge of phase 0 is aligning with the rising edge of the first external clock signal plus or minus a half of the second external clock signal's period. As such, all other phases generated by the multi-phase clock generator 320 have a minimum distance between their rising edge and the rising edge of the first external clock signal of a half of the clock period of the second external clock signal. Thus, based on the reset release provided by the reset synchronizer 310, the multi-phase clock generator 320 provides a multi-phase clock out of the second external clock signal. A phase of the multi-phase clock can be selected, therefore, that can safely take data from the first external clock signal. Likewise, a phase of the multi-phase clock can be selected that that can safely deliver data to the first external clock signal.

For example, consider when N equals 2. The following Table 1 shows the timing between the first external clock signal rising edge and the rising edges of two internally generated clock phases depending on the skew/delay between the second external clock signal rising edge and the first external clock signal rising edge. In this example, the second external clock signal (2X) has a high pulse of five time units and a low pulse of five time units. The two clock signals, the first external clock signal (1X) and the second external clock signal (2X), get skewed in one time-unit steps. The first column is the delta between the two external clock signals. The second column is the delta between the first external clock signal (1x) and an internal clock signal (clock phase 0). The third column is the delta between the first external clock signal (1x) and a second internal clock signal (clock phase 1). The data of Table 1 is in time units. The period of the first external clock signal (1X) is 20 time units in Table 1. The period of the second external clock signal (2X) in Table 1 is 10 time units.

TABLE 1

Differences Between Rising Edges of Clock Signals

| Delta 2x clock 1x clock 0 TU | Delta 1x clock phase0 0 TU | Delta 1x clock phase 1 10 TU |
|---|---|---|
| 1 | 19 | 9 |
| 2 | 18 | 8 |
| 3 | 17 | 7 |
| 4 | 16 | 6 |
| 5 | 5 | 15 |
| 6 | 4 | 14 |
| 7 | 3 | 13 |
| 8 | 2 | 12 |
| 9 | 1 | 11 |
| 0 | 0 | 10 |

Table 1 indicates that the delta between clock phase 1 (e.g., first internal generated clock signal) and the first external clock signal is always between five and fifteen time units. As such, there is always a delta of half the high-speed clock, the second external clock signal, between the first external clock signal rising edge and the rising edge of the internal clock signal clock phase 1. Accordingly, there is a secure data transfer when clocking data from the first external clock signal with the phase 1 clock signal and when clocking data from the phase 1 clock signal with the first external clock signal. The phase relationship between the first external clock signal and the phase clock signals depends on the phase relation during reset-release. Therefore, the insertion delay of the first and second external clock signals can be ignored on the top-level of an integrated circuit. Instead, with the multi-phase scheme of the multi-phase synchronizer 300 a secure interface can be built within a module of the integrated circuit.

FIG. 4 illustrates a graph 400 of input and output waveforms of a multi-clock interface constructed according to the principles of the disclosure for the example of N=2. The graph 400 includes waveforms for the asynchronous reset signal, the first external clock signal (1x), the second external clock signal (2x), a first internal clock signal (Phase 0) and a second internal clock signal (Phase 1). As noted on Phase 1 signal waveform, a minimum distance between a rising edge of the first external clock signal (1X) and a rising edge of the Phase 1 signal is half of the second external clock signal (2X) period. A minimum distance between a rising edge of the Phase 1 signal and a rising edge of the first external clock signal (1X) is also noted as being half of the clock period of the second external clock signal. A window where the rising edge of the Phase 1 signal can occur to ensure safe data capture is also indicated as the clock period of the second external clock signal. The dashed lines on each side of the clock-pulse (i.e., the solid-lined pulse) for the Phase 1 and Phase 0 signals indicate a range for each of the clock pulses, respectively. If the delta between the first external clock signal (1X) and the second external clock signal (2X) is zero, then the clock-pulse for each respective phase would be the solid-lined pulse. For a zero delta, the first external clock signal (1X) and the second external clock signal (2X) have aligned rising edges during the reset. The dashed pulse before the solid-lined pulse represents a delta of four time units. A delta of five time units is represented by the dashed pulse after the solid-lined pulse.

FIG. 5 illustrates a graph 500 of input and output waveforms of a multi-clock interface constructed according to the principles of the disclosure for the example of N=3. The graph 500 includes waveforms for the asynchronous reset signal, the first external clock signal (1x), a second external clock signal (3x), and internal generated clock signals Phase 0, Phase 1 and Phase 2. As noted on Phase 1 signal waveform, a minimum distance between a rising edge of the first external clock signal 1X and a rising edge of the Phase 1 signal is one and a half times the second external clock signal 3x period. A minimum distance between a rising edge of the Phase 1 signal and a rising edge of the first external clock signal (1X) is denoted as being half of the clock period of the second external clock signal (3X). A window where the rising edge of the Phase 1 signal can occur to ensure safe data capture is indicated as the clock period of the second external clock signal 3x. As described above with respect to FIG. 4, the ranges for the clock pulses of the internal generated clock signals Phase 0, Phase 1 and Phase 2 are represented by the dashed lines. As such, the dashed lines on either side of the solid-lined clock pulses indicate a boundary of the wave forms.

Figure 6:
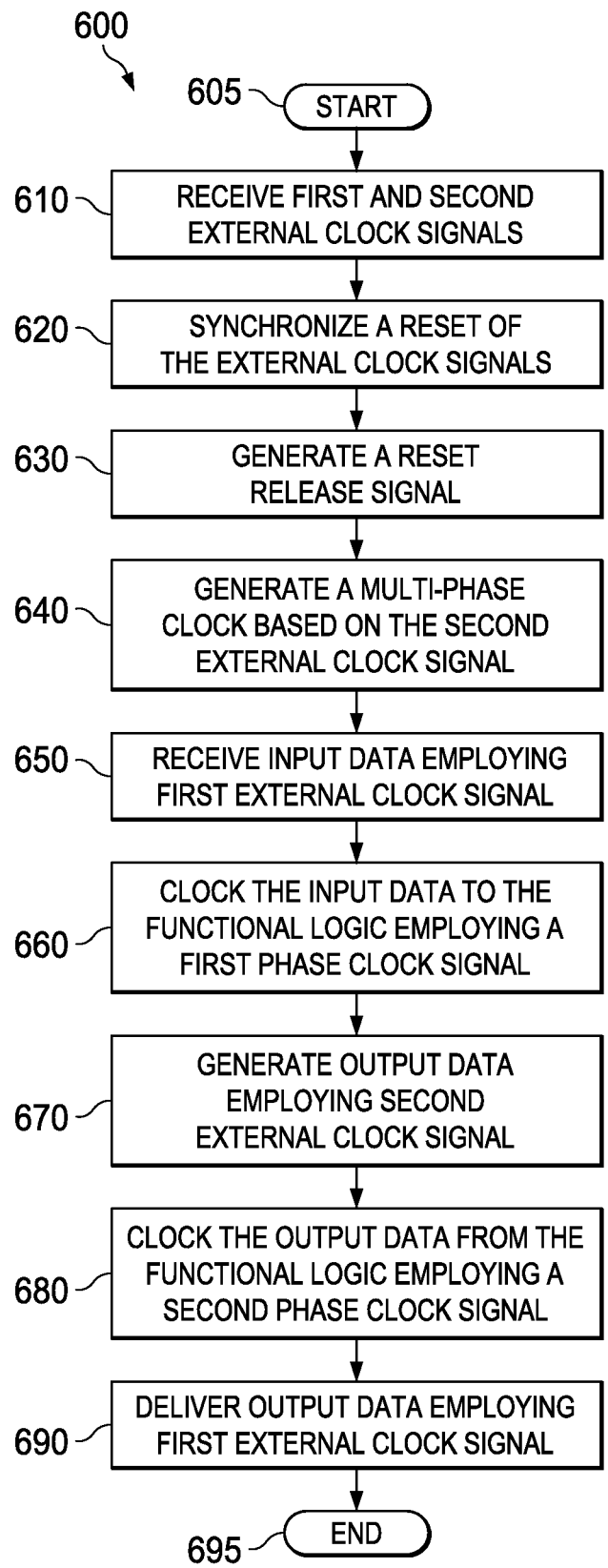
FIG. 6 illustrates a flow diagram of an embodiment of a method of an IC module generating output data carried out according to the principles of the disclosure.

FIG. 6 illustrates a flow diagram of an embodiment of a method 600 of an IC module generating output data carried out according to the principles of the disclosure. The method 600 begins in a step 605.

In a step 610, a first and a second external clock signal are received wherein the second external clock signal is a multiple of the first external clock signal. The first and second external clock signals may be received by a module, such as a hard macro, of an integrated circuit. As such, the first and second external clock signals may be generated external to the module. The hard macro may be a RAM or another unit that may internally require a higher speed and has a defined interface to an outside environment that may operate at a lower speed. For example, the hard macro may be multi-port RAMs, processor units or arithmetic units.

A reset for the first and second external clock signals is synchronized in a step 620. An asynchronous reset signal may be employed to synchronize the reset. The asynchronous reset signal may be received by the module from the integrated circuit.

Based on the synchronization of the two external clock signals, a reset release signal is generated in a step 630. In a step 640, a multi-phase clock is generated employing the reset release signal and the second external clock signal.

Employing the first external clock signal, input data is received by the IC module in a step 650. A first phase clock signal from the multi-phase clock is then employed in a step 660 to clock the input data between the first external clock signal to functional logic of the module that operates at the second external clock signal. Output data is generated in a step 670 at the second external clock signal. A second phase clock signal from the multi-phase clock is employed in a step 680 to clock the output data from the functional logic employing the second external clock signal. The output data is then clocked from the second phase clock signal to the first external clock signal to deliver the output data from the IC module in a step 690. The output data may be delivered to the integrated circuit. The method 600 then ends in a step 695.

The disclosure provides a data interface that can be used to build modules, such as hard-macros, for integrated circuits that operate internally with a higher (Nx) frequency than a top level clock (1X) without the need to provide insertion delay matching. A module of an integrated circuit may use the 1x clock to receive and deliver data and use the Nx clock internally to operate on the data. Interface flip-flops of the module may operate with the 1x clock (eases timing closure on top level) and the functional logic of the module can operate with a higher frequency clock (Nx). With the disclosed data interface, a phase relation between the external generated 1x and Nx clocks is not required.

The disclosure provides circuitry configured to ease top-level clock-tree implementation since clock-tree delay matching is not required. By improving the top-level clock-tree implementation, an entire design of an integrated circuit can be improved. The various disclosed circuitry can be included in a library of cells allowing implementations of designs to provide a clock-tree interface that is internal to a module of the integrated circuit and independent of insertion delay associated with the module. The library may include cells, for example, that correspond to the disclosed data interface, the multi-clock interface and a hard macro employing the data interface or the multi-clock interface. Cells representing FIG. 1, FIG. 2 and FIG. 3, for example, or at least a portion thereof, may be included in the library. In addition to being used as part of a standard cell library, the disclosed circuits may be used as part of compiler generated designs or full-custom designs.

Those skilled in the art to which this application relates will appreciate that other and further additions, deletions, substitutions and modifications may be made to the described embodiments.

What is claimed is:

1. A multi-clock interface, comprising:
   a multi-clock reset synchronizer configured to receive a first external clock signal and a second external clock signal that is a multiple of said first clock signal, said reset synchronizer configured synchronize a reset of both said first and second external clock signals and based thereon generate a single reset release signal; and
   a multi-phase clock generator configured to receive said single reset release signal and said second external clock signal, said multi-phase clock generator configured to generate multiple clock phases from said second external clock signal based on said single reset release signal.

2. The multi-clock interface as recited in claim 1 wherein timing between a rising edge of said first external clock signal and a rising edge of each of said multiple clock phases is a function of a delay between said rising edge of said first external clock signal and a rising edge of said second external clock signal.

3. The multi-clock interface as recited in claim 1 wherein a phase relationship between each of said multiple clock phases and said first external clock signal is a function of said second external clock signal and said single reset release signal.

4. The multi-clock interface as recited in claim 1 wherein a minimum distance between rising edges of a first phase of said multiple clock phases and said first external clock signal is within half of a period of said second external clock signal.

5. The multi-clock interface as recited in claim 4 wherein a rising edge of said first phase occurs within a clock period of said second external clock signal.

6. The multi-clock interface as recited in claim 1 wherein said multi-clock reset synchronizer includes a first pair of reset flip-flops for said first external clock signal and a second pair of reset flip-flops for said second external clock signal, wherein a data input for said second pair of reset flip-flops is a data output of said first pair of reset flip-flops.

7. The multi-clock interface as recited in claim 6 wherein said single reset release signal is a data output of said second pair of reset flip-flops.

8. An integrated circuit module, comprising:
   an input interface configured to receive input data at a first external clock signal and provide captured input data at a first internal clock signal;
   functional logic configured to receive said captured input data from said input interface and generate data output at a second external clock signal that is a multiple of said first external clock signal;
   an output interface configured to receive said output data at a second internal clock signal and provide delivered output data at said first external clock signal; and
   a multi-clock interface configured to generate said first and said second internal clock signals based on said second external clock signals, said multi-clock interface including:
      a multi-clock reset synchronizer configured to receive said first and said second external clock signals, synchronize a reset of both said first and second external clock signals and based thereon, generate a single reset release signal; and
      a multi-phase clock generator configured to receive said single reset release signal and said second external clock signal, said multi-phase clock generator configured-to generate said first and said second internal clock signals from said second external clock signal based on said single reset release signal.

9. The integrated circuit module as recited in claim 8 wherein timing between a rising edge of said first external clock signal and a rising edge of each of said first and second internal clock signals is a function of a delay between said rising edge of said first external clock signal and a rising edge of said second external clock signal.

10. The integrated circuit module as recited in claim 8 wherein a phase relationship between each of said first and second internal clock signals and said first external clock signal is a function of said second external clock signal and said single reset release signal.

11. The integrated circuit module as recited in claim 8 wherein a minimum distance between rising edges of said first internal clock signal and said first external clock signal is within half of a period of said second external clock signal.

12. The integrated circuit module as recited in claim 11 wherein a rising edge of said first internal clock signal occurs within a clock period of said second external clock signal.

13. The integrated circuit module as recited in claim 8 wherein said multi-clock reset synchronizer includes a first pair of reset flip-flops for said first external clock signal and a second pair of reset flip-flops for said second external clock signal, wherein a data input for said second pair of reset flip-flops is a data output of said first pair of reset flip-flops.

14. The integrated circuit module as recited in claim 13 wherein said single reset release signal is a data output of said second pair of reset flip-flops.

15. The integrated circuit module as recited in claim 13 wherein said input interface includes an interface flip-flop configured to receive said input data at said first external clock signal and a capture flip-flop coupled thereto that is configured to capture said data from said receive flip-flop employing said first internal clock signal.

16. The integrated circuit module as recited in claim 15 wherein said output interface includes a receive flip-flop configured to receive said output data at said second external clock signal from said functional logic and a capture flip-flop coupled to said receive flip-flop that is configured to capture said output data from said receive flip-flop employing said first external clock signal.

17. An integrated circuit, comprising:
   a clock configured to generate a first external clock signal and a second external clock signal that is a multiple of said first external clock signal;
   an integrated circuit module, comprising an input interface configured to receive input data at said first external clock signal and provide captured input data at a first internal clock signal;

functional logic configured to receive said captured input data from said input interface and generate data output at said second external clock signal;

an output interface configured to receive said output data at a second internal external clock signal and provide delivered output data at said first external clock signal; and a multi-clock interface configured to generate said first and said second internal clock signals based on said second external clock signals, said multi-clock interface including:
- a multi-clock reset synchronizer configured to receive said first and said second external clock signals, synchronize a reset of both said first and second external clock signals and based thereon, generate a single reset release signal; and
- a multi-phase clock generator configured to receive said single reset release signal and said second external clock signal, said multi-phase clock generator configured to generate said first and said second internal clock signals from said second external clock signal based on said single reset release signal.

18. The integrated circuit as recited in claim 17 wherein said multi-clock reset synchronizer includes a first pair of reset flip-flops for said first external clock signal and a second pair of reset flip-flops for said second external clock signal, wherein a data input for said second pair of reset flip-flops is a data output of said first pair of reset flip-flops.

19. A library of cells, comprising:

logic circuitry corresponding to a multi-clock interface, including:
- a multi-clock reset synchronizer configured to receive a first external clock signal and a second external clock signal that is a multiple of said first clock signal, said reset synchronizer configured to synchronize a reset of both said first and second external clock signals and based thereon generate a single reset release signal; and
- a multi-phase clock generator configured to receive said single reset release signal and said second clock signal, said multi-phase clock generator configured to generate first and second internal clock signals from said second external clock signal based on said single reset release signal.

20. The library as recited in claim 19 further comprising logic circuitry corresponding to an integrated circuit module including:

an input interface configured to receive input data at said first external clock signal and provide captured input data at said first internal clock signal;

functional logic configured to receive said captured input data from said input interface and generate data output at said second external clock signal; and an output interface configured to receive said output data at said second external clock signal and provide delivered output data at said first internal clock signal.

* * * * *